United States Patent [19]

Vollaro

[11] Patent Number: 4,833,638

[45] Date of Patent: May 23, 1989

[54] PARALLEL PROCESSING STATE ALIGNMENT

[75] Inventor: John R. Vollaro, Clinton, N.J.

[73] Assignee: Bell Communications Research, Inc., Livingston, N.J.

[21] Appl. No.: 945,489

[22] Filed: Dec. 23, 1986

[51] Int. Cl.[4] .............................................. G06F 9/00
[52] U.S. Cl. ................................................... 364/900
[58] Field of Search ............................... 364/200, 900

[56] References Cited

U.S. PATENT DOCUMENTS 4,392,196  7/1983  Glenn et al. ....................... 364/200

Primary Examiner—Gareth D. Shaw
Assistant Examiner—John G. Mills
Attorney, Agent, or Firm—James W. Falk; John T. Peoples

[57] ABSTRACT

Circuitry, and associated methodology, in a parallel processing environment for aligning the various processing states of the autonomous processors communicating over a common bus assures that the order of execution and alignment of processing states is preserved across processors. This is effected by augmenting each processor with a state alignment network for inhibiting, within one interval of the global reference generator, generation of global reference signals. The reference generator is restarted only after all processing is completed in the order required by the allocation of tasks among the processors. To provide maximal efficiency, the state alignment network incorporated an arrangement to detect periods of delay between scheduled tasks and to automatically advance to the next immediate state requiring processing.

12 Claims, 3 Drawing Sheets

PARALLEL PROCESSING STATE ALIGNMENT

FIELD OF THE INVENTION

This invention relates generally to multiple processor configurations and, more particularly, to circuitry and associated methodology for aligning related state changes that are computed asynchronously in the different processors.

BACKGROUND OF THE INVENTION

A programmable digital computer provides a flexible environment to simulate complex systems such as a multi-layer protocol or a communication network. A system model, once described, can be analyzed extensively and then the model may be modified to study the effects of perturbations. Although there are numerous methods of simulation, they depart primarily in their details, not in their general characteristics. Most general purpose simulators exhibit the following essential characteristics: (1) the model, once activated from an initial condition, is represented by a series of events corresponding to changes in states of the model and, oftentimes, these changes are associated with particular instants of time in a simulated time environment; and (2) simulated time must not be affected by the time required to compute the events or state changes.

In order to make some simulations tractable, quite often it is required that parallel processing be utilized for complex models. With parallel processing, computations of the changing states of the model are subdivided into tasks that are suitable for execution in parallel. An inherent problem in the parallel approach, however, is the difficulty in ensuring that the computations, which are distributed among the processors for autonomous execution, are properly synchronized or aligned. As a simple example, it is supposed that two processors are executing in parallel and the first processor requires the results from the second processor. Then, the simulation must be arranged so that the second processor communicates its results to the first processor before the second processor may continue its computations; this is particularly important if the second processor completes its execution before the execution of the first processor is completed.

In one conventional approach to solve this state alignment problem, software techniques have been utilized. Scheduling, signaling and checking algorithms required to preserve the execution sequence generate considerable overhead which substantially reduces the efficiency gained through parallel processing.

To alleviate the problems associated with software approaches, circuit arrangements have recently been proposed as an alternative solution. Representative of the most recent conventional circuit arrangements is U.S. Pat. No. 4,392,196 issued to Glenn et al.

Glenn et al discloses means for aligning simulated time between the individual processors in a multiple processor emulation system. This is accomplished by using a time window established within each processor and a master timing signal. During execution, any processor which is operating within the time frame of the common window may continue execution. Any processor which falls behind the window must halt the advance of the master signal until the processor can execute long enough to move back into the window. Any processor which moves ahead of the window must enter an idle state until the master signal advances enough for the processing element to move back into the window.

In Glenn et al, it is necessary to choose a set of parameters that scale the operation of the synchronization mechanism according to the system that is being modeled. This can be done effectively as long as the duration of tasks executing by the individual processors, measured in units of simulated time, does not vary over a broad range. When judiciously selected, simulated time advances at a rate that mitigates processor idle time and thus contributes to execution efficiency. However, a less than judicious selection can result in poor execution efficiency and even to a loss of time alignment.

The resolution of the time alignment mechanism in Glenn et al varies in correspondence to two parameters, namely, the window span and the increment of simulated time upon each advance of the master signal. The constraints on these parameters are generally as follows. The increment must be no greater than the length of time of the smallest task being modeled. The window span must be no greater than the smallest duration of time to be aligned or synchronized. A conservative way to use the system of Glenn et al is to maximize its resolution by choosing the smallest possible values for the parameters. However, this maximizes the number of master signal transitions required to advance simulated time and, thereby, reduces execution efficiency to a minimum since the processors will spend more time idling as simulated time is advanced incrementally through the inevitable periods of inactivity. In a simulation that inherently has long periods of simulated time between state changes, the reduction of efficiency is substantial. A simulation that includes long periods between clusters of state changes dictates a small increment parameter and, accordingly, suffers low execution efficiency.

Thus, Glenn et al require careful study of the simulation model and judicious choice of parameters to strike an appropriate balance between alignment resolution and execution efficiency. The number of choices vary as the number of systems to be modeled is varied.

SUMMARY OF THE INVENTION

The above-described shortcomings and limitations of the conventional methods and circuitry for aligning the processing states allocated to a plurality of processors comprising a multiple processor system are obviated, in accordance with the present invention, by providing each autonomous processor with means for inhibiting the master or global reference generator within one unit of simulated time. The reference generator is restarted only after all task processing is completed in the order required by the sequence of changing states. Moreover, execution efficiency is maximized by automatically detecting the inevitable periods of long delay between scheduled states and advancing to the earliest, next scheduled state in a few, predetermined units of simulated time.

The organization and operation of this invention will be better understood from a consideration of the detailed description of the illustrative embodiments thereof, which follow, when taken in conjunction with the accompanying drawing.

BRIEF DESCRIPTION OF THE DRAWING

In the Figures, reference numerals of like elements are incremented by 1000, 2000 and so forth depending upon the particular processor under consideration in the multiple processor system.

DETAILED DESCRIPTION

Figure 1:
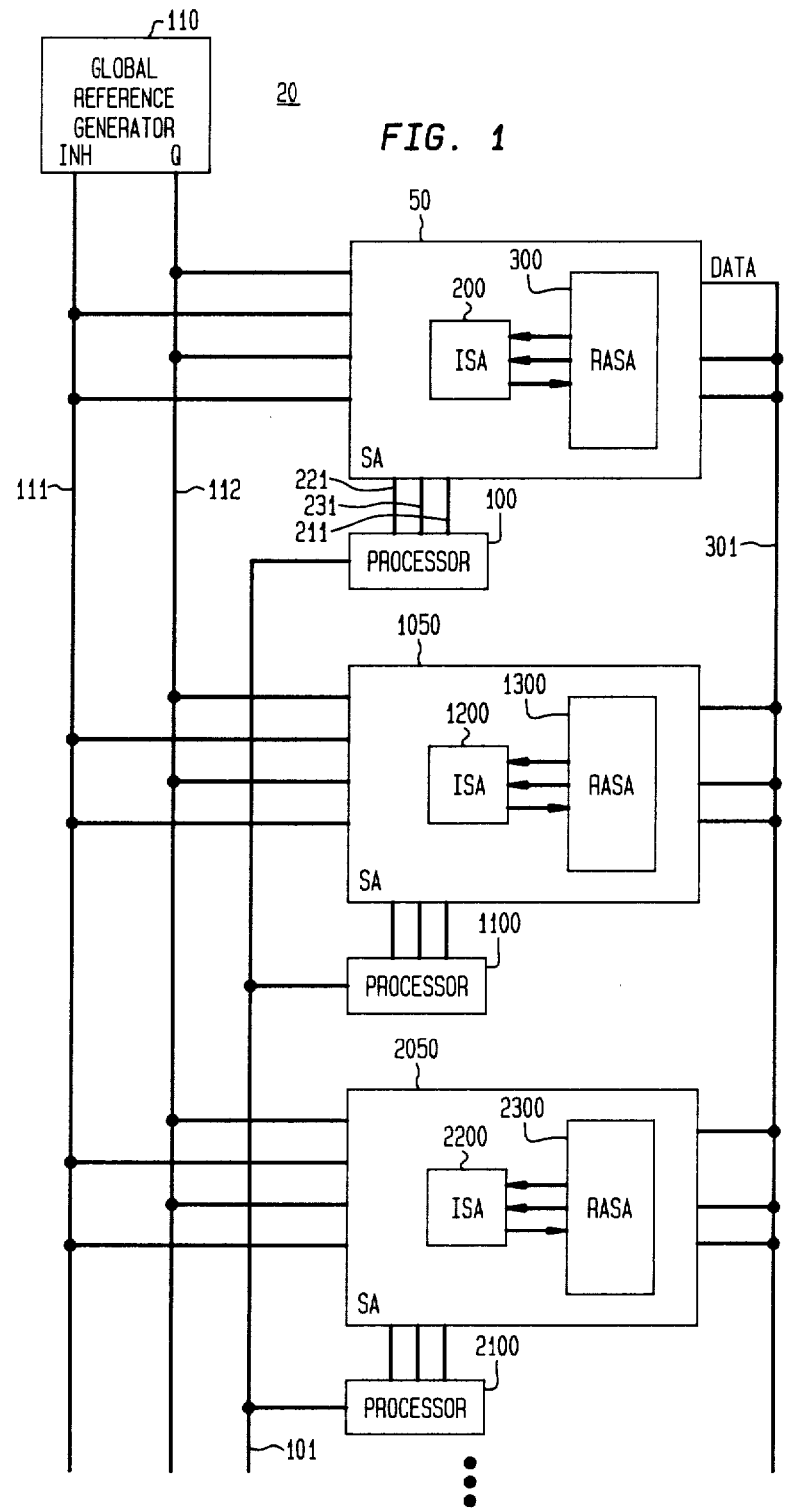
FIG. 1 is a block diagram depicting three processors, and their associated state alignment (SA) circuits, comprising a multiple processor system configured in accordance with the present invention.

With reference to FIG. 1, three autonomous processors 100, 1100 and 2100 in multiple processor system 20 are interconnected via common communication bus 101, which is illustratively the VME-type bus well-known in the computer art. All other processors not shown are connected to bus 101 in the same manner. Each processor 100, 1100 or 2100 couples to an associated state alignment (SA) circuit 50, 1050 or 2050, respectively. All SA circuits 50, 1050 and 2050 are identically connected to global reference generator 110 via inhibit (INH) lead 111 and pulse (Q) lead 112. Moreover, SA circuits 50, 1050 and 2050 are connected to DATA bus 301. All other state alignment circuits not depicted are connected to generator 110 and bus 301 in the same fashion. In addition, each processor 100, 1100 or 2100, and its associated SA circuit, operates in essentially an autonomous mode, that is, in the sense that each processor is composed of an internal clock (not shown) which is independent of the clocks from all other processors. Although the processors operate autonomously, the processors form a parallel processing system having a need to interact such as, for example, by transmitting information generated in or stored by one processor to certain of the other processors requiring that information. This is effected by sending an interrupt signal over bus 101 in the conventional manner.

As is also depicted in FIG. 1, each SA circuit 50, 1050 or 2150 is composed of two major subcircuits, namely, incremental state alignment (ISA) network 200 and rapid advance state alignment (RASA) network 300.

Figure 2:
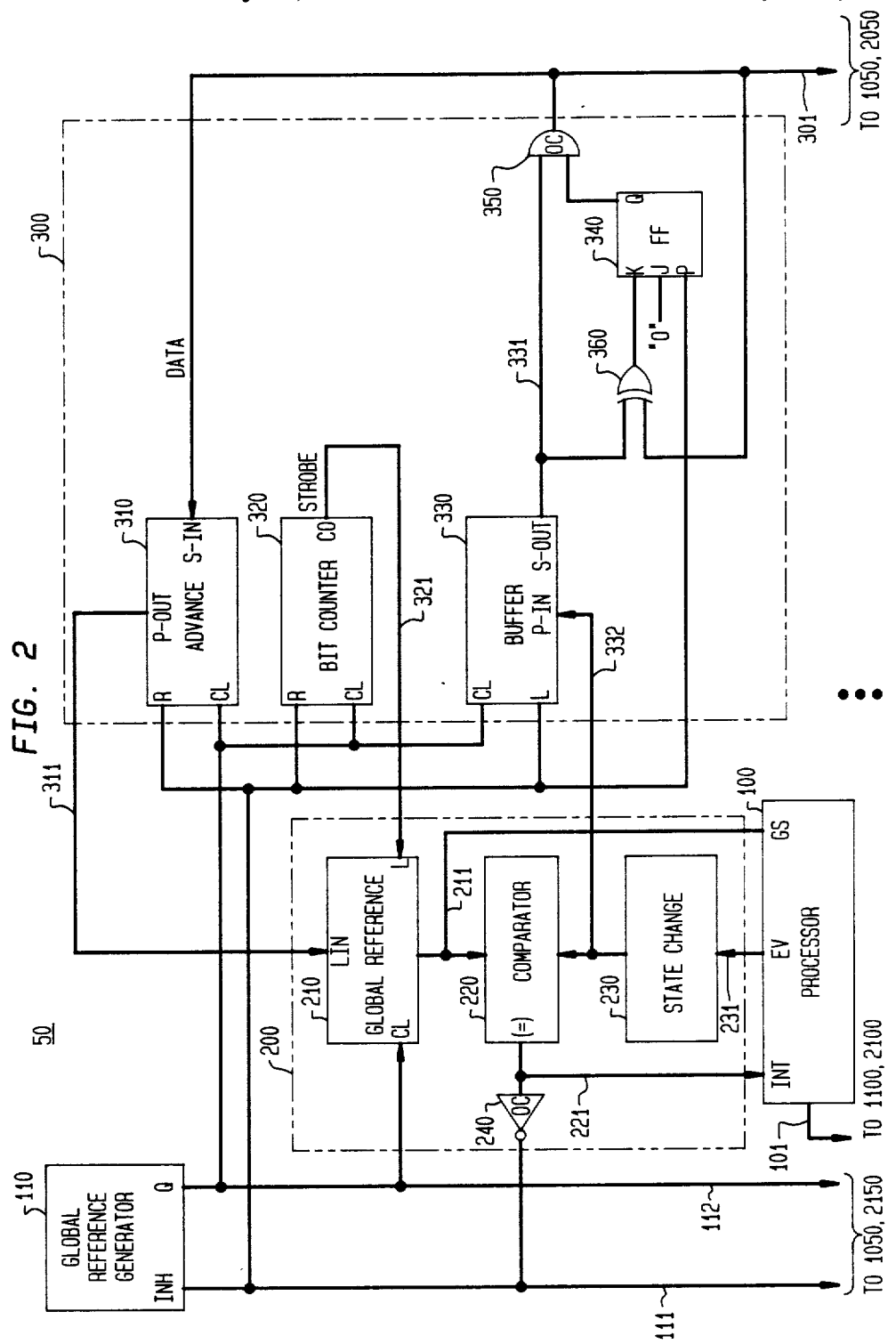
FIG. 2 depicts, again in block diagram form, one processor and its associated state alignment circuit from FIG. 1, wherein the SA circuit is shown to comprise an incremental state alignment (ISA) portion and a rapid advance state alignment (RASA) portion.

Referring now to FIG. 2, a representative SA circuit, namely SA circuit 50 associated with processor 100, is depicted in block diagram form. Focusing first on ISA network 200, state change register 230 stores information indicative of the next state change scheduled by processor 100. This information is provided to register 230 via bus 231 emanating from processor 100. Global reference element 210 is a combination register and counter having two input modes. As a counter, element 210 registers the state alignment pulses produced by reference generator 110 as present on lead 112 at the CL input of element 210. As a register, element 210 loads the data present on bus 311, via the LIN input, whenever the L input to element 210 is activated. Futher details with respect to the register mode will be presented shortly when rapid advance network 300 is discussed.

Both state change register 230 and global reference element 210 provide inputs to comparator 220. Whenever the two inputs become equal, comparator 220 produces a logic 1 level on lead 221 at its output. The signal on lead 221, when inverted by open-collector inverter 240, provides a corresponding signal on lead 111 which is connected to the inhibit (INH) input of global reference generator 110. Because of the arrangement of all open-collector inverters in SA circuits 50, 1050 and 2050, as exemplified by inverter 240, lead 111 behaves as a wired-OR bus. Thus, a logic 1 level at the output of comparator 240 produces a dominant logic 0 which overrides any logic 1 level on lead 111 and generator 110 is inhibited, that is, suspends its production of pulses on lead 112. Otherwise, a logic 0 from comparator 220 produces a passive logic 1 at the output of inverter 240 and SA circuit 200 will not control lead 111. Also, it is noted that the output of comparator 220 is coupled to the interrupt input of processor 100 so a logic 1 on lead 221 signals processor 100 that state change register 230 and global element 210 have attained equality. By way of notation, a logic 1 at the output of comparator 220 is referred to as a disable signal and a logic 0 is called an enable signal. It also should be noted that the output of global element 210 is provided to processor 100 via bus 211.

In terms of an operational description of ISA network 200, it is supposed that processing commences from the initialized state wherein the content of global element 210 is zero and state change register 230 has been loaded with a non-zero representation of the next scheduled state change, say "2" on a normalized basis. Global element 210 is incremented by each pulse from generator 110. When element 210 registers a "2", comparator 220 produces a logic 1, and lead 111 is asserted low through inverter 240. All global elements 210, 1210 and 2210 cease incrementing. Moreover, processor 100 is notified of the disable signal via an interrupt on lead 221 and may respond, for example, by broadcasting information to the remaining processors 1100 and 2100 over bus 101. When the communication is completed, processor 100 loads state change register 230 with new state change data. To keep reference generator 110 from advancing in the event that the processors receiving transmitted state changes have not fully responded, that is, calculated new state changes and posted them, before the transmitting processor posts its next state change, an interlocking mechanism is required. Interlocking may be accomplished via a communication protocol established over bus 101 or in circuit form by latching INH lead 111 until all processors receiving messages have processed the information and released their respective latches. Comparator 220 now produces an enable signal, and global generator 110 reactivates and produces pulses on lead 112. A full deactivate-reactivate cycle of incremental state alignment network 200 is now completed. The cycle is incremental in the sense that global element 210 is successively augmented by the sequence of state alignment pulses. This is in contrast to a global load of element 210 from RASA 300 wherein the content of element 210 after loading is generally independent, but greater than, its prior content as well as the pulses emanating from generator 110.

Global reference generator 110, described broadly in the foregoing, may be comprised, illustratively, of a master clock and means such as an AND circuit, operating under control of the INH signal on lead 111, for gating the master clock signals onto pulse or Q lead 112.

The RASA network 300 of SA circuit 50 is configured as follows. Advance element 310 is a serial-in, parallel-out shift register having, respectively, serial input on DATA bus 301 and parallel output on bus 311. Bit counter 320 is a counter having a maximum count equal to the number of bits in global element 210. For instance, if element 210 is 32 bits in length, then counter 320 is a 5-bit counter. Buffer 330 is a parallel-in, serial-out shift register, via bus 332 and lead 331, respectively. Flip-flop 340 is a J-K type with the ability to be preset. EXCLUSIVE-OR circuit 360, responsive to buffer 330 and the information on bus 301, serves as the K input to flip-flop 340. Both the output of buffer 330 and flip-flop 340 serve as inputs to opencollector AND gate 350. The output of gate 350 is also coupled to DATA bus 301. Strobe lead 321 is driven by the carry-out signal from bit counter 320 and this signal serves as the load signal to global reference element 210 in ISA network 200.

From the earlier description, the processing of a scheduled state change occurs whenever INH lead 111 to reference generator 110 is asserted, that is, a low is present on lead 111. Because lead 111 also serves as input to advance register 310 and bit counter 320, both are reset when lead 111 is asserted. Moreover, the assertion on lead 111 also results in buffer register 330 being loaded with the contents of state change register 230 via bus 332. Finally, flip-flop 340 is preset by the low on lead 111. The state triggered by the low on lead 111 is considered to be the initial state of RASA network 300. This initial state must be established by the time INH is released and reference generator 110 is reactivated.

When lead 111 is released, that is, becomes high due to all processors 100, 1100 and 2100 loading newly scheduled state changes into their respective state change registers exemplified by register 230, then advance register 310, buffer register 330 and bit counter 320 as well as global reference element 210 synchronously begin to receive reference pulses from generator 110 via lead 112. Flip-flop 340 and EXCLUSIVE-OR gate 360 control the gating of data from buffer 330 onto DATA bus 301 in the following manner.

Since flip-flop 340 has been preset by lead 101, data on lead 331 from buffer 330 is conditioned to pass through AND gate 350 onto bus 301. Any other RASA networks 1300 and 2300 may also place data simultaneously on bus 301. The open collector characteristics of AND gate 350 allow a low signal level, that is, a logic 0, to dominate and thereby control bus 301. Accordingly, the state of the bus 301 is controlled by only one particular buffer register 330, 1330 or 2330. The actual state of bus 301 is the smallest value, in the binary number sense, being passed by the plurality of buffer registers 330, 1330 and 2330 that are accessing bus 301. This is insured for each RASA network 300, 1300 or 2300 because of the operation of gate 360 (similarly for gates 1360 or 2360), which compares the state of bus 301 to the output of buffer 330 (similarly for buffers 1330 or 2330). When the state differs from the output, flip-flop 350 is reset and the output of buffer 330 is isolated from bus 301 by gate 350. Ultimately, the "least value" state on bus 301 is shifted into advance ragister 310, as well as the other advance registers 1310, 2310. This state represents the earliest, next-scheduled state change.

If there is a carry-out signal from bit counter 320, as manifested by a pulse on strobe lead 321, the contents of advance register 310 are loaded into global reference element 210, thereby completing the rapid advance state alignment cycle. Because all other RASA networks 1300 and 2300 have a strobe lead identical to lead 321, global reference elements 1210 and 2210 are also loaded with the "least value" state. In this manner, the contents of each global reference element exemplified by element 210 are skipped ahead without the need of waiting for incremental advances. Because the "least value" dominates bus 301, element 210 is skipped ahead in an ordered fashion, from the least value to the highest value state change and, thereby, ordering is effected automatically.

It should also be understood that if a state change occurs, that is, comparator 220 outputs a disable signal and a rapid advance cycle is in progress, the rapid advance cycle is canceled and reinitialized by the overriding signal propagating over lead 111.

In regard to the above description, the elements and devices comprising ISA network 200 and RASA network 300 are all well-known elements that are readily available. The speed of operation of these elements and devices are selected so that reference generator 110 may be readily inhibited within one reference signal interval or pulse period.

Figure 3:
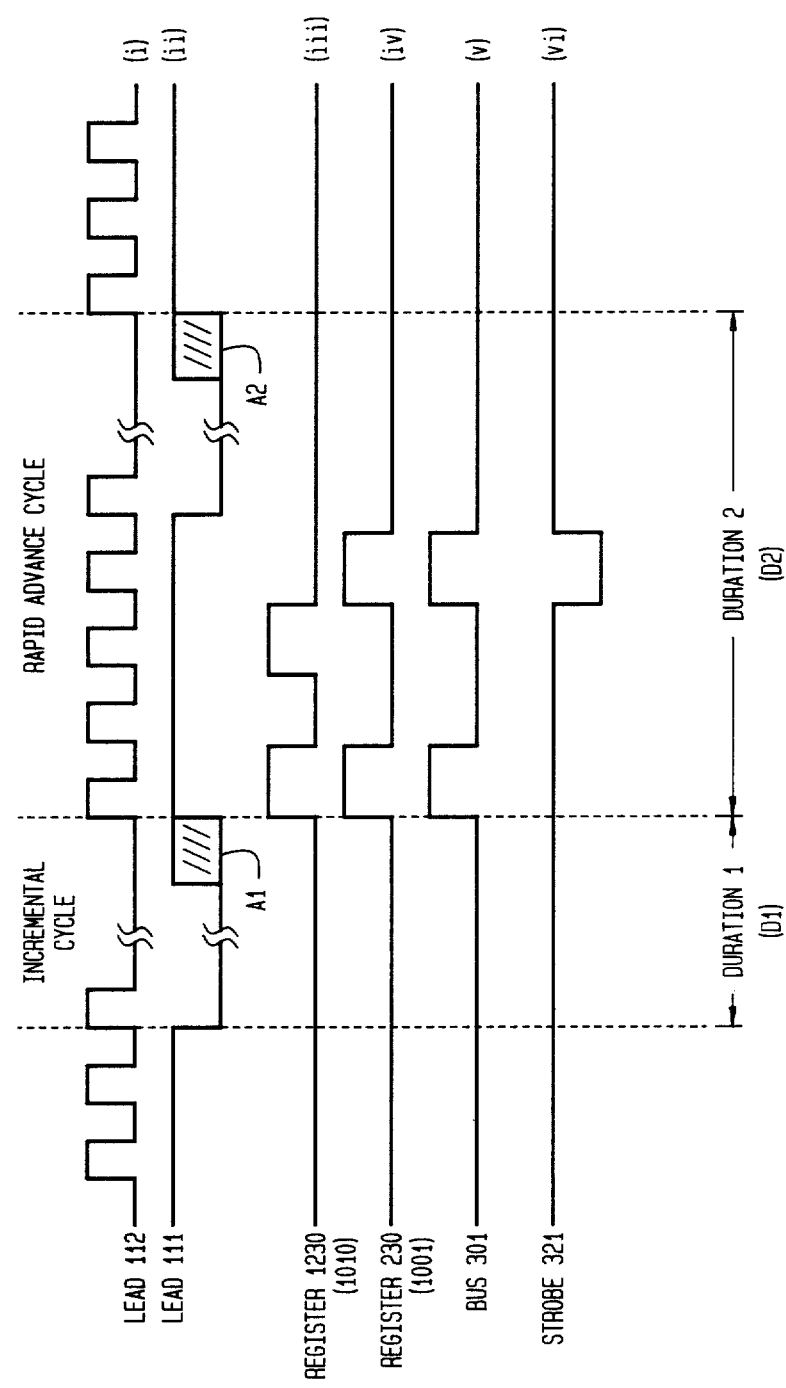
FIG. 3 is a timing diagram illustratively of an incremental advance followed by a rapid advance.

To exemplify the timing required of the various components comprising alignment circuit 50, FIG. 3 depicts a timing diagram illustrative of an occurrence of an incremental cycle followed by a rapid advance cycle. In FIG. 3, it is presumed that the various registers 210, 230, 310 and 330 are configured with 4 bits, primarily for compactness of presentation of the timing diagram.

On line (i) of FIG. 3, the reference pulses produced on lead 112 by generator 110 are depicted. Initially, pulses occur because the condition of INH lead 111, shown on line (ii), is high. At an appropriate point, shown by the first vertical broken line, lead 111 is asserted low due to a match between, say, global reference element 210 and state change register 230. Within one cycle of generator 110, reference pulses no longer emanate from lead 112. During the interval marked DURATION 1 or D1, the processor corresponding to the matched condition is executing and, if required, communicating with other processors over bus 101 of FIG. 1.

At some point in the interval D1, lead 111 is asserted high; this is depicted by region A1 on line (ii). The components of state alignment circuit 50 are arranged so that the first pulse from lead 112 after the release of INH lead 111 is a full pulse. This is shown on line (i) at the second vertical broken line which partitions the termination of the incremental cycle and the beginning of the rapid advance cycle. The rapid advance cycle has a duration shown as DURATION 2 or D2.

At the beginning of D2, two state change registers 230 and 1230 are loaded with binary data 1001 and 1010, respectively, for illustrative purposes. In decimal terms, the next scheduled state changes are to occur after "9" and "10" pulses, respectively, from generator 110. Since counter 320 is a 2-bit counter, a carry-out will occur on the leading edge of the fifth clock pulse; the carry-out strobe signal is shown on line (vi) of FIG. 3.

Prior to the strobe, however, the state of bus 301 is being determined on a dynamic basis as each clock pulse occurs. The state of bus 301 is depicted on line (v), and as described earlier, represents the least value, in a binary sense, stored by the various state change registers 230, 1230 and so forth. Lines (iii) and (iv), respectively, depict the contents of registers 1230 and 230 for the illustrative timing diagram, as the contents are being shifted out serially from corresponding buffer registers 1330 and 330, respectively. As shown, the contents of register 230 determines the state of bus 301.

Once the strobe signal on 321 occurs, global reference registers 210, 1210 and so forth are loaded with the state change corresponding to the minimum bus state which, in this case, is binary 1001 stored in register 230. Once loaded, comparator 220 determines an equality condition has occurred, and INH lead 111 is asserted low. This is depicted on line (ii) as occurring on the leading edge of the fifth generator pulse. Thus, global reference element 210 has been skipped ahead from "4" to "9", on a normalized basis. Similarly, other global reference elements now contain a normalized value of "9".

This rapid advance cycle is completed after all processors have posted their next scheduled state changes and after they release INH lead 111. This is designated by region A2 on line (ii). The next immediate full clock pulse truncates DURATION 2 and circuit 50 is now prepared for the next cycle.

It is to be understood that the above-identified arrangements are simply illustrative of the application of the principles in accordance with the present invention. Other arrangements may be readily devised by those skilled in the art which embody the principles of the present invention and fall within its spirit and scope. Thus, for example, since each bit counter 320, 1320 or 2320 performs an identical function, it is possible to configure system 20 with only one bit counter coupled to reference generator 110 and route a single strobe lead from the single bit counter to all global elements 210, 1210 and 2210.

Also, whereas state change registers 230, 1230 and 2230 have been described illustratively as storing only the next immediately scheduled state change, it is possible to arrange each of these state change registers to store a multiplicity of ordered state changes which are, for example, selected by moving a pointer in memory under control of appropriate memory addressing means.

Moreover, although the description of the illustrative embodiment taught that reference generator 110 was the element inhibited by wired-OR lead 111, it may also be possible to provide for a free-running generator and arranged INH lead 111 to inhibit registration of reference signals in each global element 210, 1210 and 2210.

Therefore, it is to be further understood that the circuitry and methodology described herein is not limited to specific forms disclosed by way of illustration, but may assume other embodiments limited only by the scope of the appended claims.

What is claimed is:

1. Circuitry in a multiple processor system for aligning the processing states of autonomous processors interconnected by a common communication channel, said circuitry comprising
    means for generating successive reference signals,
    means, responsive to the processors, for storing quantities indicative of the next processing states as scheduled by each of the associated processors, and
    means, coupled to said generating means and said storing means, for comparing the number of said generated reference signals to said quantities and for inhibiting said generating means whenever said number is equivalent to any of said quantities.

2. Circuitry as recited in claim 1 further comprising means, coupled to said storing means, for increasing said number of generated signals by a value corresponding to the earliest of said next processing states after a predetermined number of said successive reference signals has occurred.

3. In combination with a plurality of autonomous processing means communicating over a common bus, circuitry characterized by
    means for generating reference signals at a prescribed rate, and
    in association with each processing means, state alignment means comprising
        means, coupled to its associated processing means, for storing a quantity indicative of the next event as scheduled by the associated processing means,
        means, responsive to said means for generating, for registering said reference signals,
        means, coupled to said storing means and said registering means, for comparing the contents of said storing means to the contents of said registering means to provide a comparison signal whenever said contents are equivalent, and
        means, coupled to said comparing means, for inhibiting said means for generating whenever said comparison signal is present and for notifying the associated processing means upon detection of said comparison signal.

4. The circuitry as recited in claim 3 wherein said means for notifying includes means for notifying all other processing means upon detection of said comparison signal.

5. The circuitry as recited in claim 3 wherein said circuitry further comprises
    means, coupled to the plurality of each said storing means and each said registering means, for loading the contents of said storing means having the least-valued quantity into each said register means if said comparison signal is not generated by any of said comparing means before a preselected number of said reference signals.

6. The circuitry as recited in claim 3 wherein
    said alignment means further comprises rapid advance means, and
    said circuitry further comprises a data bus interconnecting the plurality of said rapid advance means.

7. The circuitry as recited in claim 6 wherein said rapid advance means further comprises
    means, responsive to said generating means, for providing a strobe signal after a predetermined number of said reference signals,
    means, coupled to said storing means, for receiving the contents of said storing means after said comparison signal is removed,
    means, interposed between said receiving means and said data bus, for serially placing at said rate the contents of said receiving means onto said data bus until the occurrence of a mismatch between said contents of said receiving means and data on said data bus,
    means, coupled to said registering means, for saving the data generated on said data bus and then loading the contents of said saving means into said register means whenever said strobe signal is produced, and
    means for reinitializing each said rapid advance means if any of said alignment means produces said comparison signal before the occurrence of said strobe signal.

8. In combination with at least two stand-alone processors interconnected with a common communication bus, circuitry comprising
  master clock means for providing gated clock signals, and
  a plurality of alignment means, one for each of the processors, each said alignment means comprising
    means, coupled to its associated processor, for storing the time of the next event as scheduled by the associated processor,
    means, responsive to said clock means, for registering said gated clock signals,
    means, coupled to said means for storing and said means for registering, for generating a disable signal whenever the contents of said means for storing and said means for registering are equal and for generating an enable signal otherwise, and
    means, coupled to said means for generating and said clock means, for inhibiting said clock means and for notifying all processors in response to said disable signal and for enabling said clock means in response to said enable signal.

9. The circuitry as recited in claim 8 wherein
  said alignment means further comprises rapid advance means, and
  said circuitry further comprises a data bus linking each said rapid advance means.

10. The circuitry as recited in claim 9 wherein said rapid advance means further comprises
  counter means, responsive to said clock means, for generating a strobe signal after a preselected number of said gated clock signals,
  buffer means, coupled to said storing means, for receiving the contents of said storing means in a parallel mode whenever said enable signal is generated,
  least-value determining means, coupled between said buffer means and said data bus, for serially transmitting at the rate of said clock means the contents of said buffer means over said data bus until a mismatch occurs between said contents of said buffer means and the data on said data bus,
  advance register means, coupled to said means for registering, for saving the data generated by said data bus and then parallel loading of the contents of said advance register means into said means for registering whenever said strobe signal occurs, and
  means, coupled to said advance register means, said counter means, said buffer means and said determining means for resetting each said rapid advance means whenever any of said alignment means produces said disable signal before the occurrence of said strobe signal.

11. A method in a multiple processor system for aligning the processing states of autonomous processors communicating over a common bus, said method comprising the steps of
  generating a series of reference pulses,
  storing quantities indicative of the next processing states as scheduled by each of the associated processors,
  comparing the number of generated pulses to said quantities, and
  inhibiting said step of generating whenever said number of pulses is equivalent to any of said quantities, said step of inhibiting occurring until the processor providing said any of said quantities stores a new next state.

12. The method as recited in claim 11 further comprising the step of increasing said number of pulses by a value corresponding to the earliest of said next processing states after a predetermined number of said pulses has elapsed.

* * * * *